United States Patent [19]

Swallert

[11] Patent Number: 4,662,412
[45] Date of Patent: May 5, 1987

[54] INFLATING DEVICE FOR USE SINGLE-HANDED

[75] Inventor: Sven A. Swallert, Geneva, Switzerland

[73] Assignee: Peter Bergmann, Bandhagen, Sweden

[21] Appl. No.: 862,872

[22] Filed: May 13, 1986

[51] Int. Cl.⁴ .............................................. B65B 3/04
[52] U.S. Cl. .................................... 141/284; 141/38; 141/366; 152/415; 222/544
[58] Field of Search ................. 141/38, 364, 365, 366, 141/348–363, 1–12, 250–284; 251/353, 347; 152/415; 222/3, 4, 544

[56] References Cited

U.S. PATENT DOCUMENTS 1,623,775  4/1927  Blanchard ........................... 141/366
4,307,763 12/1981  Wang .................................. 141/366

*Primary Examiner*—Houston S. Bell, Jr.
*Attorney, Agent, or Firm*—Sughrue, Mion, Zinn, Macpeak and Seas

[57] ABSTRACT

This invention relates to an inflating device, preferably for inflating vehicle tires, comprising a housing (1), a gas cartridge (8) arranged for sliding action in the housing, and an outer sleeve (12) slidably arranged on the outer surface of the housing (1) and in pressure contact with an upper part of the gas cartridge (8) at one end (2) of the housing. The cartridge has a neck (9) which incorporates a non-return valve (16). The end (3) of the housing (1) opposite the aforesaid one end has an inwardly extending post (5) which has extending axially and centrally therein a fine channel 4, the center lines of the post and channel being concentrical with the housing 1. The channel discharges at one end into a recess (7) in the bottom (3) of the housing (1), the recess having connection means for sealing connection with valve adaptor means (20) on the object to be inflated. Axial movement of the cartridge to an inflating position is effected by lightly pressing the upper end of the outer sleeve (12) in contact with the cartridge, this movement being effected against the action of a return spring force (10).

3 Claims, 1 Drawing Figure

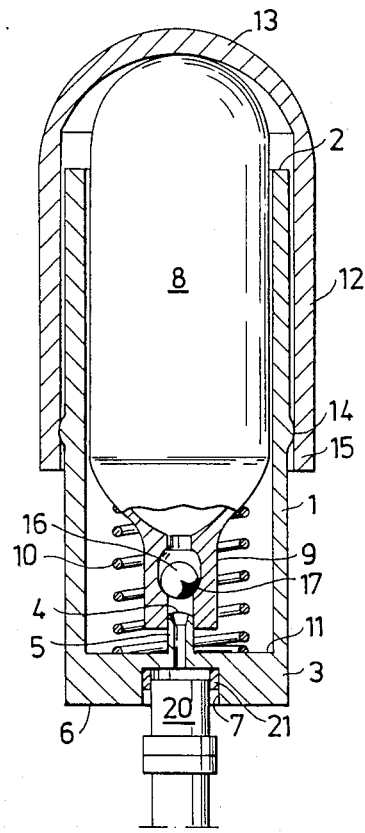

INFLATING DEVICE FOR USE SINGLE-HANDED

TECHNICAL FIELD

The present invention relates to an inflating device for use single-handed, and particularly, although not exclusively, to a device for inflating bicycle tires, said device being provided with a replaceable gas cartridge and being highly suitable for mass production. It is necessary that tire inflating devices of this kind can be mass produced, in extremely large numbers, in order to be able to compete on the market with similar inflatable devices of this and corresponding kinds.

BACKGROUND PRIOR ART

A simple device for inflating the inner tube of a bicycle, motor vehicle etc., is illustrated and described in U.S. Pat. No. 2,575,908. This device incorporates a gas cartridge with a neck which is closed internally by means of a metal diaphragm. The cartridge neck has an internal screw thread by means of which it can be screwed to the external threads of a conventional valve connector or adaptor of a motor-vehicle inner tube. Arranged in the cartridge neck is an axially displaceable pin which when the neck is screwed onto the valve adaptor is moved towards the diaphragm and punctures the same. One drawback with this known device is that the whole of the cartridge is emptied at one and the same time, and that it is impossible to control the filling of the inner tube with gas.

Devices which utilize gas cartridge and intended for other purposes are known from U.S. Pat. Nos. 2,349,480, 2,673,004 and 3,051,356. In these devices the gas cartridge is enclosed in a housing, but in general has the same drawbacks as the device described in the aforegoing.

One object of this invention is to provide an inflating device which comprises a minimum of components and that said components can be readily assembled. A further object is to provide an inflating device of the aforesaid kind which (a) can be readily used with one hand, (b) is sufficiently narrow to enable it to be fitted without difficulty to the valve of a bicycle tire, with closely adjacent spokes, and (c) which requires only a slight pressure to initiate inflation of the inner tube. As soon as this slight pressure is relieved, inflation ceases automatically, so as to enable the tire (inner tube) to be inflated to a desired pressure without emptying the cartridge.

SUMMARY OF THE INVENTION

These objects are achieved with a single-handed operated inflating device according to the invention.

Accordingly this invention consists in an inflating device for use single-handed comprising a cylindrical housing which is completely open at one end and throttled at the other end thereof, said other end having located thereon an inwardly extending bottom post which is concentrical with the housing and which has a fine channel extending axially therethrough, said channel discharging at one end thereof into a recess which is located in an outer surface of the housing and which is provided with sealing means for sealing abutment with a connector or adaptor on the object to be inflated, and further comprising a gas cartridge which is slideably arranged in the housing and which has located at one end a neck which faces the bottom post and which incorporates a one-way valve, such as a ball valve, and the opposite end of which cartridge is arranged to project slightly from the open end of the cylindrical housing and abuts the inside of a closed end of a sleeve which serves as a device-activating means and which is slideably arranged on the outside of the housing, said sleeve being arranged for movement from a rearward position defined by a stop on the housing to a forward position in which the gas cartridge is held forwardly displaced by the sleeve, against the action of spring means, to an extent such that the bottom post in this position of the components holds the valve displaced in a non-sealing position while the outer surface of the bottom post lies in sealing engagement with the inner surface of the neck of the gas cartridge.

BRIEF DESCRIPTION OF THE DRAWING

The single FIGURE of the accompanying drawing is a longitudinal sectional view of an inflating device according to the invention, and shows the device connected to the wheel of a bicycle for inflating the tire thereof.

DETAILED DESCRIPTION OF AN EMBODIMENT PREFERRED AT PRESENT

The inflating device comprises solely four components, namely a cylindrical housing 1, which is completely open at one end 2, and closed at its opposite end 3, with the exception of a fine channel 4 which extends axially through a bottom post 5 which extends inwardly, coaxially with the housing 1, from the interior of the housing to a recess 7 arranged in an external end surface 6 of the housing, a conventional gas cartridge 8 with a neck 9 intended to extend towards the bottom post 5; a thrust spring 10 which rests against the internal bottom surface 11 of the housing 1 and extends along the neck 9 and holds the gas cartridge at a given distance from the bottom post 5; and a sleeve 12 which is slidably arranged on the outer surface of the housing 1 and has a closed end 13, which abuts the end of the cartridge 8 remote from the bottom post 5, said end of the cartridge projecting slightly through the open end 2 of the housing 1.

Arranged on the outersurface of the housing 1 is a circumferentially extending, slightly raised bead 14, over which the open end 15 of the sleeve 12 must be forced, in order to reach the position illustrated in the FIGURE, the open end 15 of the sleeve having an internal diameter which is slightly smaller than the diametric extension of the bead 14 and the remainder of the sleeve 12.

The cartridge neck 9 has incorporated therein a check valve, or non-return valve, comprising a ball 16 and a valve seat 17, the ball being held in sealing engagement with the valve seat by the pressure of the gas in the cartridge 8.

The post 5 has a diameter which equals substantially the inner diameter of the neck 9, and the distance between the ball 16 and the inwardly facing end of the bottom post 5 is slightly shorter than the distance between the end of the neck 9 and the bottom surface 11 of the housing 1.

When wishing to use the illustrated inflating device, the recess 7 is placed over the end of the valve adaptor 20. Due to the relatively fine dimensions of the device, length about 10 cm, diameter about 2 cm, the housing 1 with the sleeve 12 can be readily inserted between the spokes of the wheel in line with the valve seat 20, and when exerting a light pressure against the end of the sleeve 12 the gas cartridge 9 is moved towards the bottom of the housing 1, until the ball 16 has been lifted from the valve seat 17 by the end of the bottom post 5, which is formed so as to allow gas to pass readily from the cartridge 8 into the channel 4. Gas is prevented from leaking past the end of the valve adaptor 20 by means of a rubber seal 21 provided in the recess 7.

When the inner tube has been inflated to the extent desired, the flow of gas can be interrupted, by simply relieving the pressure on the end 13 of the sleeve 12, whereupon the gas cartridge 8 is lifted by the spring 10 to the position illustrated in the drawing and the valve ball 16 is pressed into sealing engagement with the valve seat 17, by the pressure of the gas remaining in the cartridge.

Because the sealing connection between the neck 9 of the gas cartridge 8 and the channel 4 is effected within the neck 9, instead of against the outside of the neck as is usual in prior art devices of this kind, there is ample room for the spring 10 on the outside of the neck. This enables the housing 1 to be made narrower along the spring 10 and at the end 3, if so desired.

The gas cartridge 8 may be filled with carbon dioxide, although for inflating cycle inner tubes and other rubber objects hexafluoride (SF6) is to be preferred, since this gas will not diffuse through rubber walls.

I claim:

1. An inflating device for single-handed use, particularly, although not exclusively, a device for inflating bicycle tires, comprising a cylindrical housing (1) which is completely open at one end (2) and throttled at the other end (3) thereof, said other end having located thereon and inwardly extending bottom post (5) which is concentrical with the housing (1) and which has a fine channel (4) extending axially therethrough, said channel discharging at one end thereof into a recess (7) which is located in an outer surface (6) of the housing and which is provided with sealing means (21) for sealing abutment with a connector or adaptor (20) on the object to be inflated; and further comprising a gas cartridge (8) which is slidably arranged in the housing and which has located at one end a neck (9) which faces the bottom post (5) and which incorporates a one-way valve, such as a ball valve (16), and the opposite end of which cartridge is arranged to project slightly from the open end (2) of the cylindrical housing (1) and abuts the inside of a closed end (13) of a sleeve (12) which serves as a device-activating means and which is slidably arranged on the outside of the housing (1), said sleeve being arranged for movement from a rearward position defined by a stop (14) on the housing to a forward position in which the gas cartridge (8) is held forwardly displaced by the sleeve (12), against the action of spring means (10), to an extent such that the bottom post (5) in this position of the components holds the valve (16) displaced in a non-sealing position while the outer surface of the bottom post (5) lies in sealing engagement with the inner surface of the neck (9) of the gas cartridge.

2. An inflating device according to claim 1, in which the spring means comprises a thrust spring (10) which extends along the outside of the neck (9) of the cartridge and lies at one end against a bottom surface (11) in the throttled end (3) of the housing.

3. An inflatable device according to claim 1 in which the gas cartridge (8) contains hexafluoride.

* * * * *